United States Patent [19]
Belanger et al.

[11] Patent Number: 5,177,825
[45] Date of Patent: Jan. 12, 1993

[54] COMPACT DRIVE-THROUGH VEHICLE WASH

[75] Inventors: Michael J. Belanger, Walled Lake; Barry S. Turner, Livonia, both of Mich.

[73] Assignee: Belanger, Inc., Northville, Mich.

[21] Appl. No.: 837,548

[22] Filed: Feb. 14, 1992

Related U.S. Application Data

[63] Continuation of Ser. No. 634,423, Dec. 27, 1990, abandoned.

[51] Int. Cl.⁵ .............................................. B60S 3/06
[52] U.S. Cl. ...................................... 15/4; 15/53.3; 15/97.3; 15/DIG. 2
[58] Field of Search ................ 15/DIG. 2, 97.3, 53.2, 15/53.3, 4

[56] References Cited

U.S. PATENT DOCUMENTS

| | | | |
|---|---|---|---|
| 3,403,416 | 10/1968 | Hurwitz | 15/53.3 |
| 3,675,262 | 7/1972 | Mello | 15/53.2 |
| 4,057,866 | 11/1977 | Belanger . | |
| 4,096,600 | 6/1978 | Belanger | 15/97.3 |
| 4,299,003 | 11/1981 | Ennis | 15/53.3 |
| 4,369,541 | 1/1983 | Belanger et al. | 15/97.3 |
| 4,424,602 | 1/1984 | Belanger et al. . | |
| 4,453,284 | 6/1984 | Schleeter | 15/97.3 |
| 4,530,126 | 7/1985 | Belanger . | |
| 4,690,065 | 9/1987 | Belanger et al. . | |
| 4,715,287 | 12/1987 | Wentworth et al. . | |
| 4,817,301 | 4/1989 | Belanger et al. . | |
| 4,930,424 | 6/1990 | Astley . | |
| 4,937,908 | 7/1990 | McCadden | 15/97.3 |

OTHER PUBLICATIONS

Superior Car Wash Systems, Inc., Equipment Layout FIG. 1.
Superior Car Wash Systems, Inc., "meet The Champ TM automatic vehicle washer", 1988.
Superior Car Wash Systems, Inc., "Our wheel alignment correlator and on-demand surface conveyor with remote hydraulic power pack".
Superior Car Wash Systems, Inc., "The Champ TM Series I brush system", The Champ TM Series II brush system, and The Champ TM Series III.

*Primary Examiner*—Edward L. Roberts
*Attorney, Agent, or Firm*—Brooks & Kushman

[57] ABSTRACT

A drive-through wash of a type in which a vehicle is translated forwardly along a longitudinal axis is disclosed. The wash includes a frame affixed to the floor and sized to allow the vehicle to pass therethrough. Right and left side washers are attached to the frame and are longitudinally aligned with one another for washing the right and left sides of the vehicle. A curtain washer is attached to the frame in lateral alignment with the right and left side washers and extends into the path of the vehicle. Right and left wraparound washers, each respectively having an elongated right and left booms are horizontally, pivotably attached to the frame on opposite sides, above the path of the vehicle, and extend rearwardly therefrom. Rotatable right and left wraparound wheels are supported on a pair of carriages that slide upon the elongated booms. The elongated booms pivot relative to the frame allowing the wraparound wheels to follow the contour of the vehicle passing through the wash. The overall assembly is a very compact apparatus that provides a relatively high quality wash in a limited time.

22 Claims, 9 Drawing Sheets fig-1 fig-6 fig-5 fig-9 fig-10 fig-11 fig-12 fig-13

COMPACT DRIVE-THROUGH VEHICLE WASH

This is a continuation of copending application Ser. No. 07/634,423 filed on Dec. 27, 1990 now abandoned.

TECHNICAL FIELD

The present invention relates to a vehicle washing apparatus and more particularly to a drive-through vehicle wash in which the vehicle is translated forwardly relative thereto along a longitudinal axis by a conveyor.

BACKGROUND ART

Automatic vehicle washes generally fall into broad categories. Drive-through vehicle washes in which a vehicle is conveyed or driven through the wash along a longitudinal conveyor and roll over vehicle washers in which the vehicle remains stationary and the wash apparatus moves relative to the vehicle. Roll over vehicle washes have the advantage that they are very compact and are relatively inexpensive. Drive-through vehicle washes take significantly greater longitudinal space and tend to be more expensive, both from the standpoint of the equipment cost as well as the building and real estate cost associated with the additional space requirements; however, speed and wash quality are typically superior.

A typical drive-through vehicle wash has an in-the-floor longitudinal conveyor such as that illustrated in U.S. Pat. No. 4,690,065, (Belanger, et al.), U.S. Pat. No. 4,715,287, (Wentworth, et al.) and U.S. Pat. No. 4,930,424, (Astley). As the vehicle is moved longitudinally by the conveyor, the vehicle is initially soaped with a soapy water mixture and moved into a wash station in which a series of cloth wheels and/or brushes wash the peripheral portions of the vehicle and an overhead cloth curtain or rotating wheel washes the upper side of the vehicle conventional washing apparatus of this type are illustrated in U.S. Pat. No. 4,057,866, (Belanger), U.S. Pat. No. 4,424,603, (Belanger, et al) and U.S. Pat. No. 4,530,126, (Belanger).

As illustrated in the preceding patents, wash equipment traditionally is modular in construction with a series of discreet washing devices longitudinally spaced along opposite sides of a conveyor. Once the vehicle leaves the wash region of the conveyor, it is rinsed and finally dried using a drying apparatus such as that illustrated in U.S. Pat. No. 4,817,301, Belanger, et al. Upon passing through the drying apparatus, the vehicle exits the conveyor. The speed with which the vehicle wash can process cars and trucks is dependent in large part upon the length of the wash station. To achieve a high quality wash, a certain level of wash time is necessary. To increase vehicle throughput, additional washing apparatus is needed to maintain sufficient wash quality.

DISCLOSURE OF THE INVENTION

The vehicle wash of the present invention is the type in which a vehicle is translated forwardly relative thereto along a longitudinal axis by a floor mounted conveyor. The vehicle wash includes a generally U-shaped frame having right, left and overhead members forming an arch of sufficient size to allow the vehicle to pass therethrough. Right and left side washers are affixed to the frame to wash the right and left sides of the vehicle. The side washers include laterally aligned wheels for simultaneously washing the right and left sides of the vehicle, an attachment member for pivotably attaching the side wheels to the frame and a wheel drive mechanism. A curtain washer is provided and is attached to the frame overhead member in lateral alignment with the right and left side washers. The curtain washer includes a subframe which supports an overhead curtain suspended therefrom, the curtain extending into the path of the vehicle. A curtain drive mechanism is provided for shifting the subframe relative to the frame to cause a relative movement between the curtain and the vehicle. Right and left wraparound washers are attached to the frame on opposite sides of the conveyor is longitudinal axis. The wraparound washers include right and left booms, each horizontally, pivotably affixed to the frame and extending inwardly and rearwardly from the frame forming an acute angle with the longitudinal axis. The right and left rotatable wraparound wheels are respectively supported on the right and left booms, providing a compact washer apparatus occupying relatively little longitudinal space.

An alternative vehicle wash apparatus embodiment includes a frame having right and left members adapted to be affixed to a floor on opposite sides of the longitudinal axis of a conveyor. First and second wraparound washers are provided that respectively have right and left booms horizontally, pivotably attached to the frame right and left members, above the path of a vehicle, and extend rearwardly therefrom. Each boom is positionable in an inward position toward the longitudinal axis to form an acute angle therewith and rotatable outward to a position in which the booms are generally parallel to the longitudinal axis. Right and left carriages are slotably mounted respectively on the right and left booms; and right and left wraparound wheels are attached to the right and left carriages respectively. Each of the right and left wheels have a maximum radius R and are rotatable about a generally vertical wheel axis. A drive mechanism for rotating the right and left wraparound wheels is provided so that, as the vehicle moves through the vehicle wash, the wraparound wheels engage the vehicles causing the booms to pivot and the carriages to translate relative to the boom, enabling the wraparound wheels to follow the outer contour of the vehicle as it passes thereby. The first wraparound washer has its boom pivotably attached to the frame at a point that is longitudinally forward, by a distance X, of the point where the second wraparound washer boom is pivotably attached to the frames X being not more than radius R.

Accordingly, an object of the present invention is to provide a compact drive-through vehicle wash apparatus that is capable of thoroughly washing the entire periphery of a car or a truck and that occupies minimal longitudinal conveyor space.

Another object of the present invention is to provide a highly dependable vehicle wash apparatus that can wash thousands of cars with little, if any, maintenance.

Yet another object of the invention is to provide a compact vehicle wash apparatus that is sufficiently small so that it can be installed in sites originally designed for roll-over washers.

These and other objects, features and advantages of the present invention will be more thoroughly understood with reference to the accompanying drawings and description.

BEST MODES FOR CARRYING OUT THE INVENTION

Figure 1:
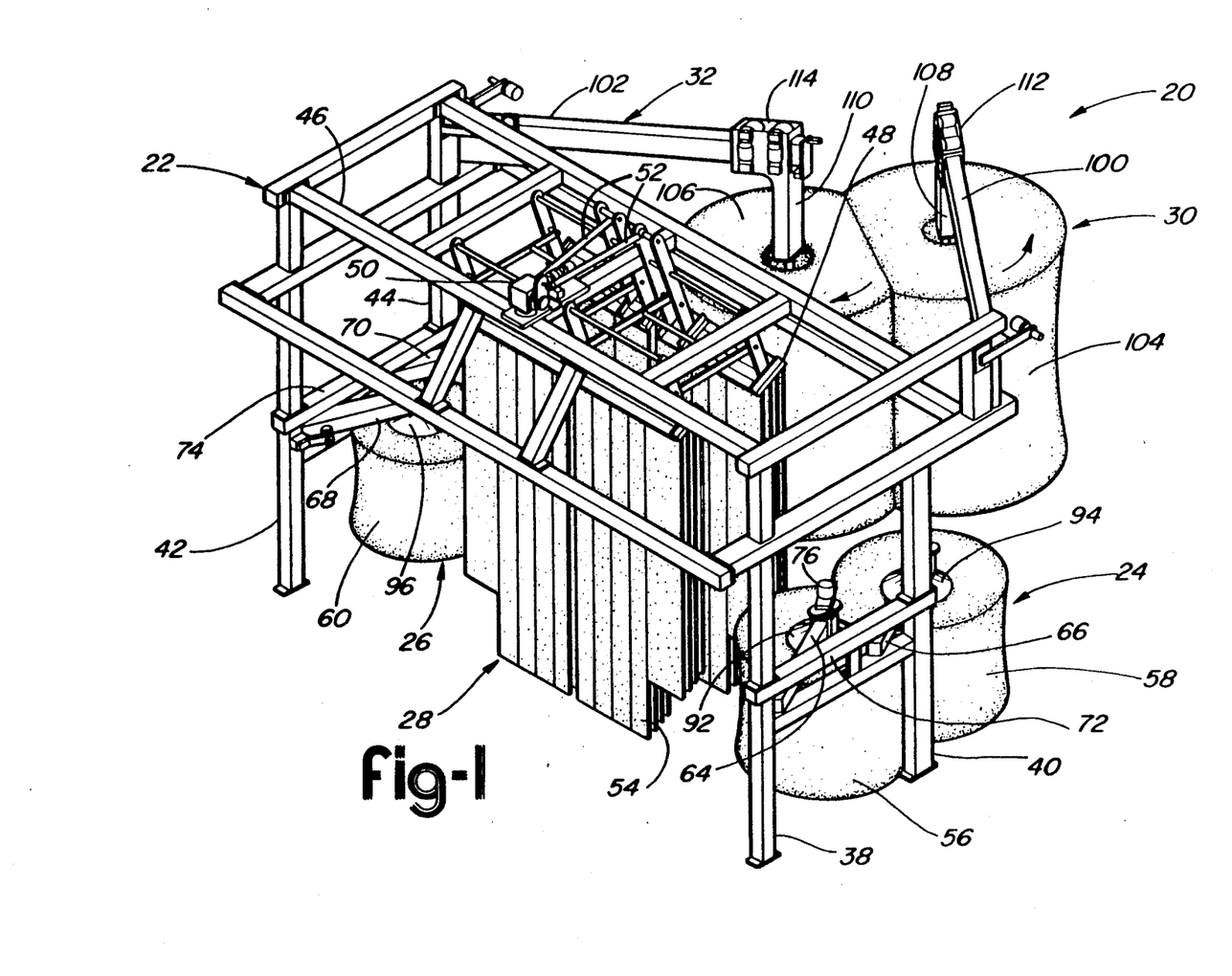
FIG. 1 is a right front perspective view of a vehicle wash of the present invention.
Figure 2:
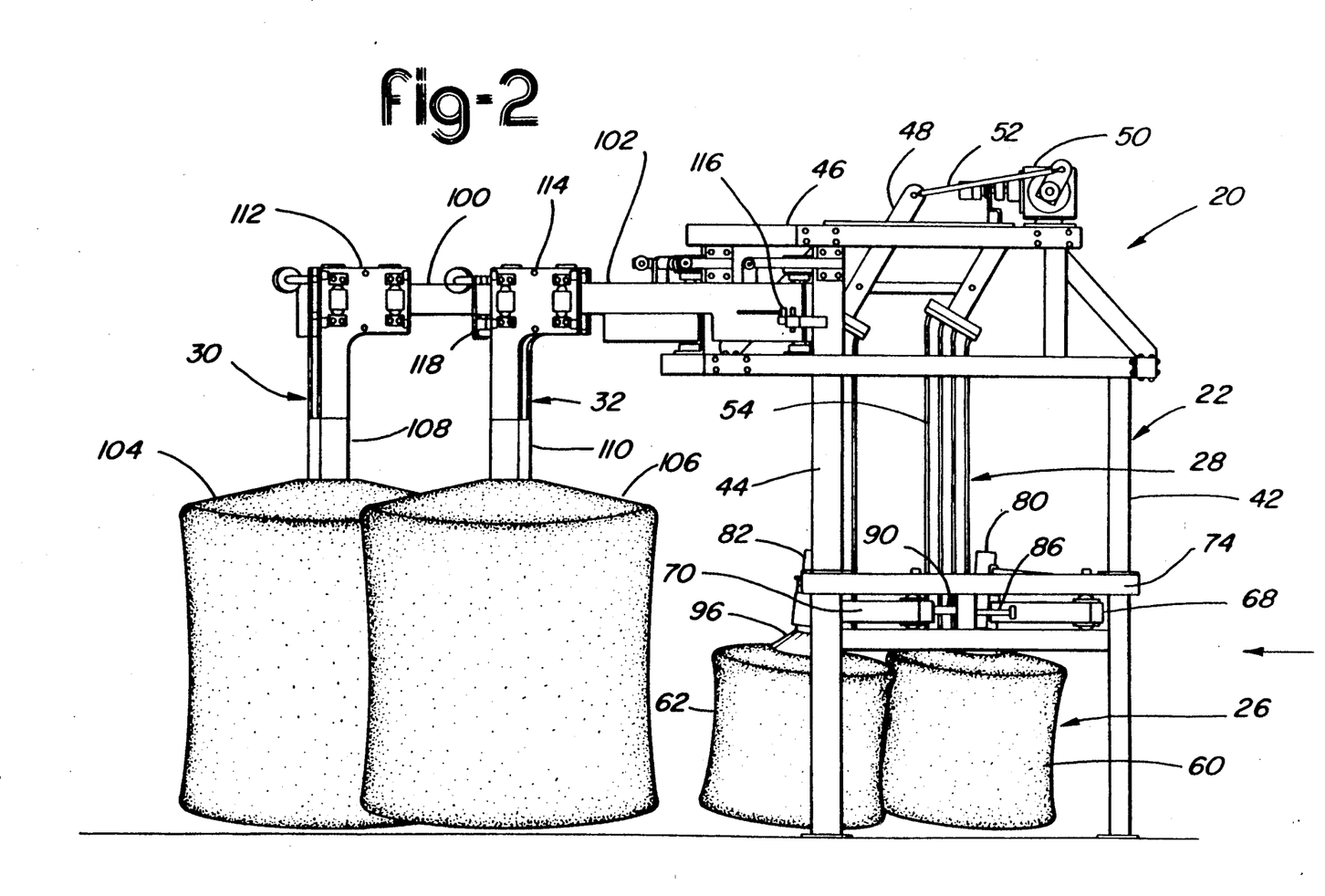
FIG. 2 is a left side elevational view of the apparatus of FIG. 1.
Figure 3:
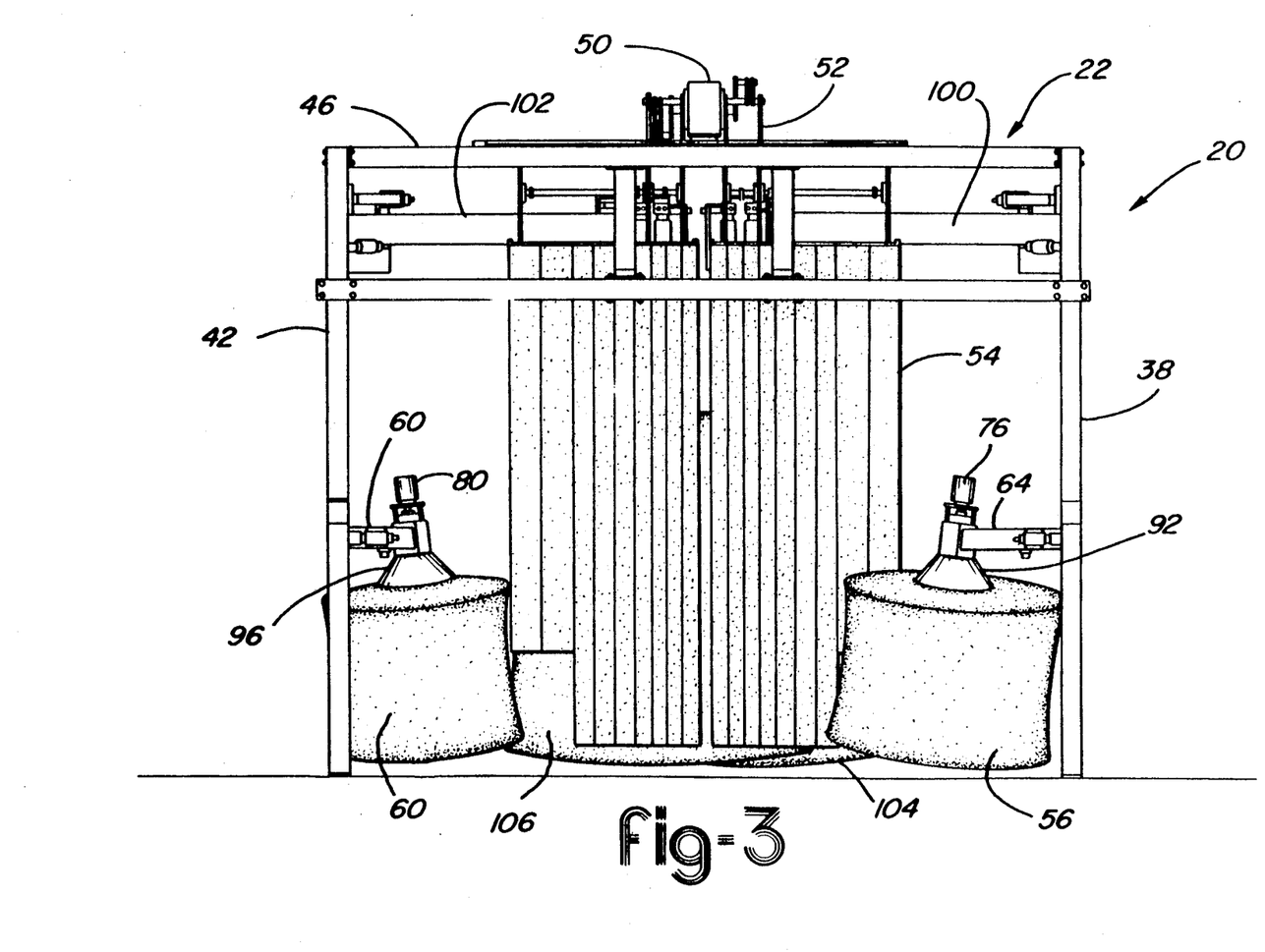
FIG. 3 is a front elevational view of the apparatus of FIG. 1.
Figure 4:
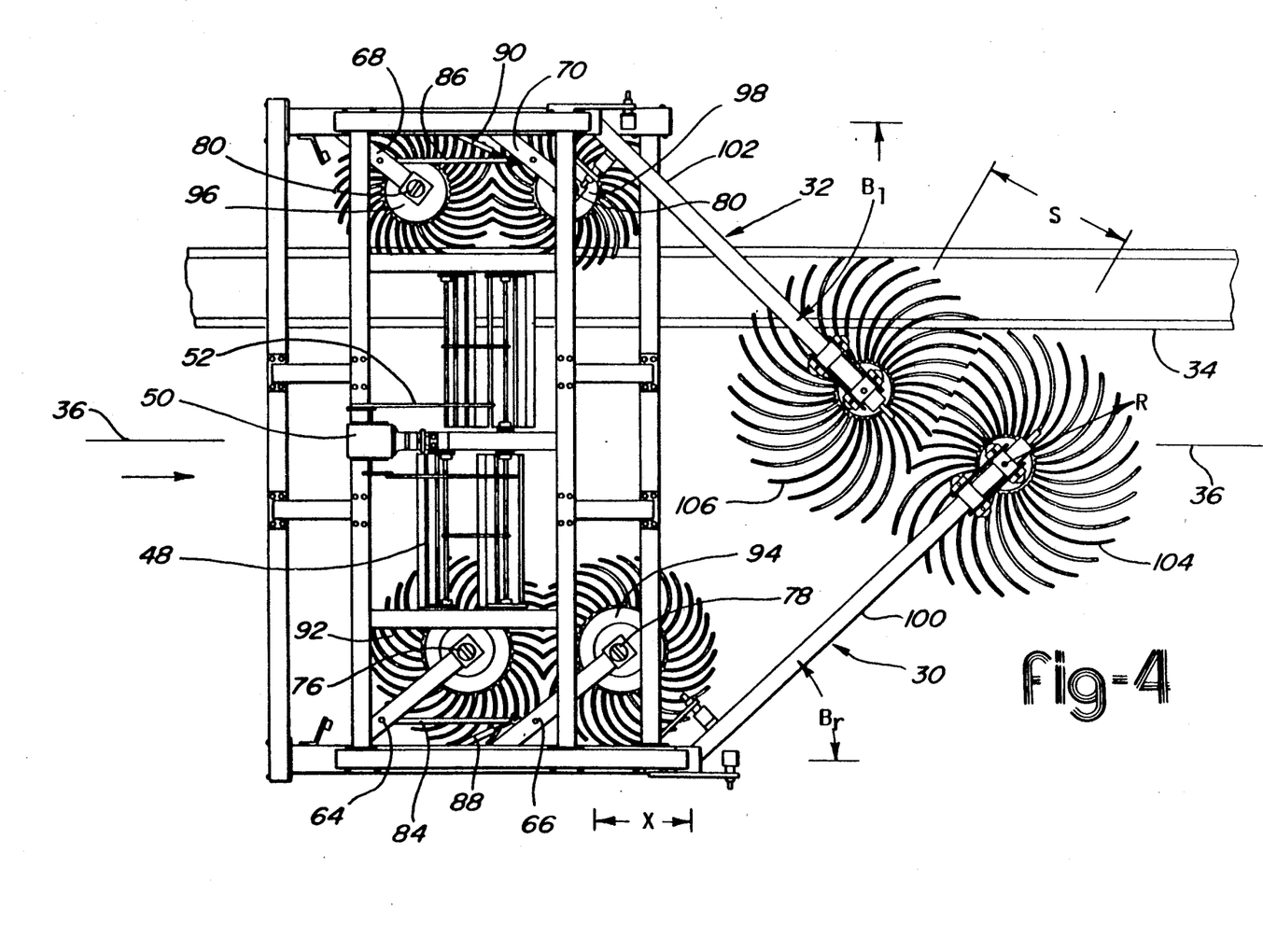
FIG. 4 is a top plan view.

Referring to FIGS. 1-4, the vehicle wash apparatus 20 of the present invention is illustrated. The vehicle wash apparatus 20 is made up of four main components: a frame 22, a pair of side washers 24 and 26, an overhead curtain washer 28, and a pair of wraparound washers 30, 32. A conveyor 34, illustrated in FIG. 4, is provided for translating a vehicle (not shown) through the washing apparatus along longitudinal axis 36 in the direction of the arrow. For purposes of the present description, the side of the wash apparatus closest to the approaching vehicle is referred to the forward side and the side of the apparatus farthest from the vehicle is referred to the rearward side. As the vehicle is moved forward, it passes beneath frame 22, which forms a generally U-shaped arch of sufficient size to accommodate typical cars, vans and small trucks. Frame 22 includes a pair of right upright members 38 and 40 and a pair of left upright members 42 and 44. Extending between the right and left upright members is an overhead member collectively referred to as 46 forming a rigid and secure frame which can be anchored to a floor by using conventional concrete fasteners.

As the vehicle enters the wash apparatus 20, the front of the vehicle will initially engage curtain washer 28. Curtain washer 28 is made up of a subframe 48 which is pivotably attached to the frame overhead member 46 and is oscillated fore and aft by a motor 50, which is connected thereto by a linkage 52. Downwardly suspended from each of the subframes 48 are a series of long cloth strips forming a curtain 54. Motor 50 oscillates subframes 48, causing the curtain to swing back and forth. As the vehicle passes beneath the oscillating curtain, the curtain movement causes a portion of the curtain engaging upper surfaces of the vehicle passing thereunder to be washed. Soapy water is applied to the vehicle and the curtain by a series of conventional spray nozzles (not shown). Curtain washers of this general design supported on independent freestanding frames are known in the industry. It should be appreciated that a variety of subframes and drive mechanisms can be utilized to move the curtain in a fore and aft, side to side, or even a rotary manner. An example of a curtain washer of somewhat similar design, having curtains oscillated in a side to side manner, is illustrated in U.S. Pat. No. 4,057,866, (Belanger), which is incorporated by reference herein in its entirety.

The curtain 56 of the present design is made up of a series of strips of varying length and width. The outermost curtain strips are of the widest and the shortest to prevent the curtain strips from becoming entangled with the side washers. As illustrated in FIGS. 1-4, side washers 24 and 26 each include a pair of counter rotating side wheels 56, 58, 60 and 62, which are respectively supported by arms 64, 66, 68 and 70. Arms 64, 66, 68 and 70, respectively, provide means for attaching the side wheels 56, 58, 60 and 62 to a right horizontal beam 72 extending between right upright members 38 and 40 and to a left horizontal beam 74 extending between left upright members 42 and 44. A series of hydraulic drive motors 76, 78, 80 and 82 are affixed to the free ends of the arms 64, 66, 68 and 70 to drive the associated side wheels. The opposite ends of arms 64, 66, 68 and 70 are pivotably attached to the right and left horizontal beams 72 and 74. Right side arms are interconnected by a link 84 to form a parallelogram linkage configuration. The left side arms 68 and 70 are interconnected by a link 86 to also form a parallelogram linkage configuration.

Actuators 88 and 90 are provided in the right and left side washers, connecting at least one of the arms to the frame to resiliently bias the side wheels to an inward position, illustrated in FIGS. 1-4, where the side wheels are relatively close to the longitudinal axis 36. When in their innermost positions, the side wheels have sufficient diameter to protrude into the path of the vehicle regardless of the vehicle's width. As the vehicle enters the wash apparatus, the side wheels are displaced outwardly in response to contact with the vehicle, the side wheels automatically following the contour of the vehicle sides.

Since the left side of the vehicle is constrained in part by the conveyor 34, there need not be as much travel of the side wheels to accommodate various vehicle designs. The right side wheels 56 and 58 are of larger diameter than the left side wheel 60 and 62, and the right arms 64 and 66 are longer than the left arms 68 and 70 to accommodate greater variation in the location of the right side of the vehicle relative to the frame due to differences in vehicle track. When the side wheels are in their innermost positions as shown in FIGS. 3 and 4, and the side wheels slightly interfere with the curtain 54. The interference is greater on the right side of the vehicle as a result of the need to accommodate vehicles having a variety of widths. As can be best illustrated in the plan view of FIG. 4, the right and left side wheels and the curtain are laterally aligned substantially at right angles to the longitudinal axis 36. This orientation enables the overall length of the vehicle wash apparatus 20 to be greatly minimized relative to previous vehicle wash equipment.

To prevent an entanglement of the curtain 54 with side washer assemblies 24 and 26, each of the side wheels forming the right pair 56 and 58 and each of the side wheels forming the left pair 60 and 62 rotate in opposite directions. A strip of curtain 54 placed between two counter rotating wheels will be pushed inwardly toward the longitudinal axis 36. The four side wheels 56, 58, 60 and 62 rotate in the directions of the arrows shown in FIG. 4. In order to provide a means to prevent a strip of curtain from wrapping around any of the motor drive shafts that rotate the side wheels 56, 58, 60 or 62, the shafts are shrouded by deflectors 92, 94, 96 and 98 respectively. The deflectors are affixed to each of the arms and are generally conical in shape as illustrated in FIG. 3 a flat plate, so as to prevent a strip of curtain from wrapping around a motor drive shaft. Preferably, each deflector has a diameter that is ¼ to ½ the diameter of an associated side wheel to provide satisfactory protection against a curtain entanglement, yet not be large to enable the deflectors to engage the sides of the vehicle.

As the vehicle moves through this wash apparatus 20, side washers 24 and 26 clean the sides of the vehicle concentrating primarily on those surfaces below window level. As can be seen in FIG. 3, the axes of each of the side wheels are inclined, the portion of the side wheel closest to the floor being closest to the longitudinal axis and the upper portion being farthest therefrom. This design enables the side wheels to better follow the contour of the vehicle and to clean the rocker panel area and low fender regions most likely to have large dirt accumulations.

The proper force of the side wheels against the vehicle is maintained by the actuators 88 and 90, which resiliently urge the side wheels toward their inwardmost positions. The actuators 88 and 90 which will be described in detail subsequently, include a spring member, providing means to urge the side wheels inwardly, as well as a hydraulic damper. The side wheels automatically return to the inward most position once the vehicle passes through the wash apparatus sufficiently to lose contact with the rearwardmost side wheel of each of the side wheel pairs.

While it should be appreciated that the preferred embodiment of the invention includes the previously described frame 22, side washers 24 and 26 and curtain washer 28, in addition to a pair of wraparound washers 30 and 32, the previously described structure, without the inclusion of the wraparound washers, is in itself novel and represents a significant improvement over the prior art and will be useful in certain limited situations.

As illustrated in FIGS. 1-4, the preferred embodiment of the wash apparatus 20 includes a pair of wraparound washers 30 and 32, which are pivotably affixed to the frame 22 on opposite sides of the path of the vehicle. Each of the side washers includes an elongated boom pivotably attached to the frame at a point above the height of the tallest vehicle to be washed. The booms 100 and 102 are each generally elongated members that are cantileveredly and pivotably suspended from the frame and extend generally rearwardly. Boom 100 and 102 are pivotable between an outward position in which the booms are generally parallel to the longitudinal axis, and an inward position, in which the booms form an acute angle with the longitudinal axis. Preferably, when in the inward position, the booms form an angle of approximately ninety degrees relative to one another.

Wraparound washers of the general design of the type utilized in conjunction with the present invention are illustrated in U.S. Pat. No. 4,424,602, (Belanger, et al), which is incorporated by reference in its entirety. Each of the wraparound washers in U.S. Pat. No. 4,424,602 are provided with its own independent, free standing frame, whereas the wraparound washers of the embodiment of the present invention are both affixed to frame 22. Although very similar in appearance, subtle differences in wraparound washers 30 and 32 enable their placement in compact arrangement to minimize the overall longitudinal length of the washing apparatus.

Right boom 100 and left boom 102 are each cantileveredly and pivotably attached to the right and left sides of the frame respectively as shown in FIG. 3. To achieve the most compact design possible, relatively little longitudinal spacing is provided between a pivot point at which the left boom 192 is attached to the frame and a pivot point at which the right boom 100 is attached to the frame. The longitudinal distance between the pivot points of the right and left booms is indicated by dimension X in FIG. 4. The booms in FIG. 4 are shown in their inwardmost positions. When at rest, the right boom 100 is disposed inwardly at an angle $B_r$ (which is preferably 45 degrees) relative to the longitudinal axis 36. When at rest, the left boom 102 is disposed at an angle $B_l$ (which is preferably 45 degrees) to the longitudinal axis.

The compact structure of the vehicle wash is achieved in substantial part as a result of the interference between right and left wraparound wheels 104 and 106. The wraparound wheels 104 and 106 are oriented along generally vertical axes and have a length that is sufficient to wash the entire side of vans and light trucks. The wraparound wheels 104 and 106 are rotatably and respectively attached to vertical members 108 and 110, which are respectively affixed to carriages 112 and 114. Carriages 112 and 114 translate along the lengths of booms 100 and 102, respectively in the manner described in U.S. Pat. No. 4,424,602. Hydraulic drive motors (not shown) are oriented within vertical members 108 and 110 for rotating wraparound wheels 104 and 106 in opposite directions as illustrated in FIG. 4.

In this embodiment, the right wraparound wheel rotates clockwise and the left wraparound wheel rotates counterclockwise when wraparound wheels are engaged with a vehicle, the rotation of the wheel initiates a reaction force that tends to urge the carriages 112 and 114 to slide from the distal ends of the booms illustrated in FIG. 2 toward the pivot points on the frame. As described in U.S. Pat. No. 4,424,602, the travel of the carriage is controlled by a cylinder and cable (not shown), which is actuated by a limit switch 116 that senses the boom angle. The booms are biased inwardly by a pair of pneumatic cylinders (not shown). A pair of hydraulic dampers (also not shown) limit the speed of the boom return in a similar manner to the hydraulic dampers in actuators 88 and 90.

In the preferred embodiment invention illustrated, the wraparound wheels 104 and 106 have a radius R. In the inward most position, wraparound wheel 104, wraparound wheel 106 interfere with one another substantially. The axes of wraparound wheels 104 and 106 are spaced apart from one another a distance S which is significantly less than 2R, the wheel diameter. Preferably, the distance S is greater than R, but less than $3R/2$. Most preferably, S is equal to $4R/3$. As the radius of the wraparound wheel increases, the relative spacing between the wheel axes must increase accordingly to allow the wraparound wheels to freely operate. While wraparound wheels of smaller diameter will enable a somewhat more compact wash apparatus, a 30 inch radius wraparound wheel is a good compromise between cleaning ability and compact size.

In order to further facilitate a compact configuration of the wraparound washers, the effective length of right boom 100, the leading boom, is significantly shorter than left boom 102, the trailing boom. In the preferred embodiment, the effective length of the boom, i.e., the distance between the boom pivot point on the frame to the wraparound wheel axis, is 92 inches in the case of the left boom and 82 inches in the case of the right boom. Once again, the dimensions of the booms are interdependent upon the wraparound wheel radius R as well as the longitudinal spacing between the boom pivot points X. The greater the distance X, the less boom length variation is necessary. Another factor complicating the design criteria are the relative angles, $B_r$ and $B_l$, which the booms are inwardly inclined. Preferably, the difference in boom length when expressed in terms of the wraparound wheel radius, falls within the range of R/4 and 3R/4. Most preferably, the boom having the forward most oriented pivot point is shorter than the trailing boom by an amount which is greater than R/4, in order to optimize the space utilization.

It should be appreciated that a compact wraparound washing apparatus of the general construction previously designed, can be built on its own frame without the use of side washers and overhead curtain washer as illustrated in the preferred embodiment.

Figures 5, 6:
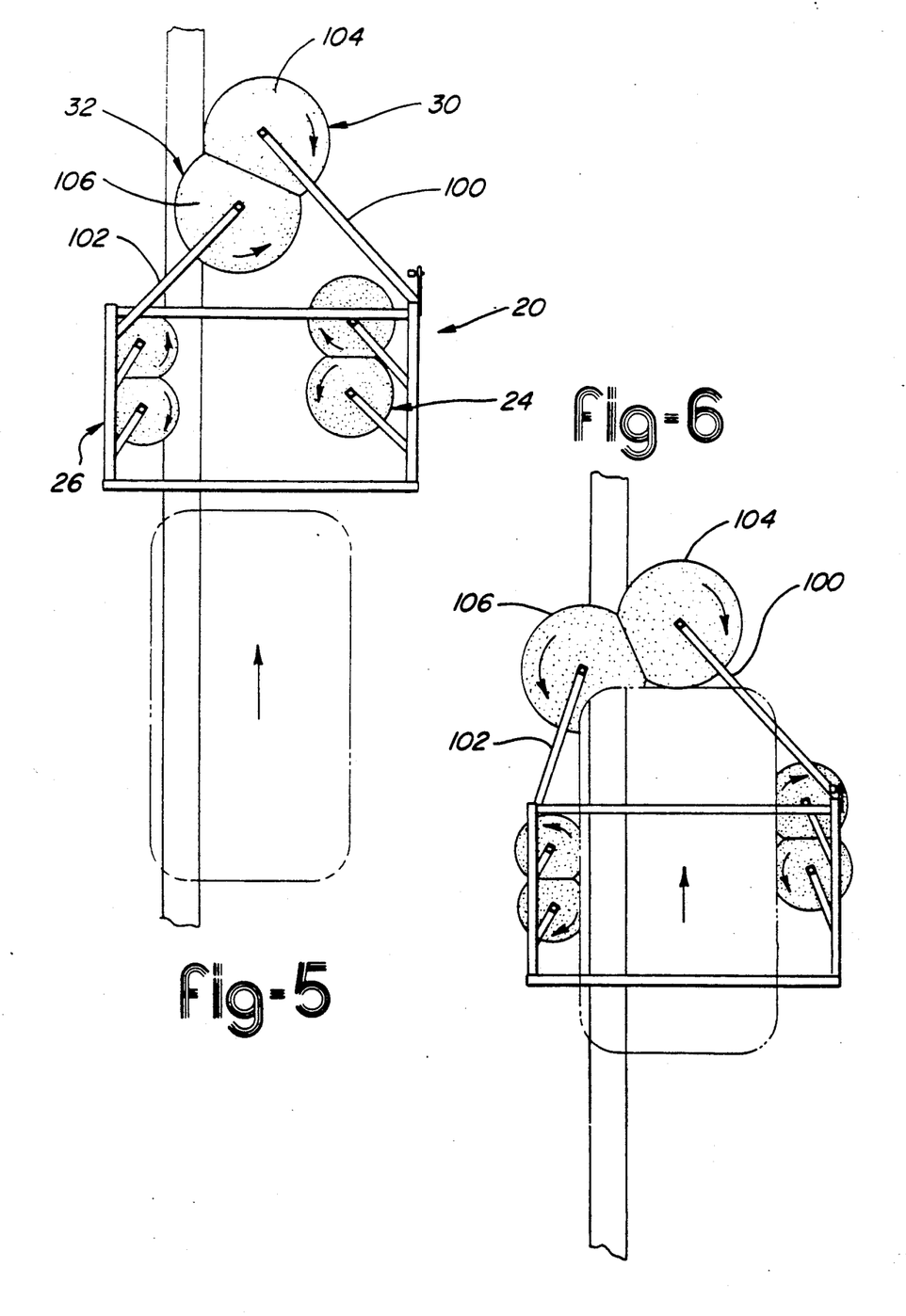
FIGS. 5-10 are a series of schematic plan views showing a vehicle at various positions along the conveyor axis.

The operation of vehicle washer 20 is illustrated in a series of plan view schematic drawings in FIGS. 5-10 showing a vehicle at various sequential longitudinal positions. In FIG. 5, the vehicle is shown in dashed outline approaching wash apparatus 20. Right side washer 24 and left side washer 26 are in their inward most position and wraparound washer 30 and 32 are likewise shown in their inward most position. As the vehicle enters the wash station, the right and left side washers are outwardly biased by the vehicle and the side wheels will follow the contour of the vehicle as it passes therethrough.

Figures 7, 8:
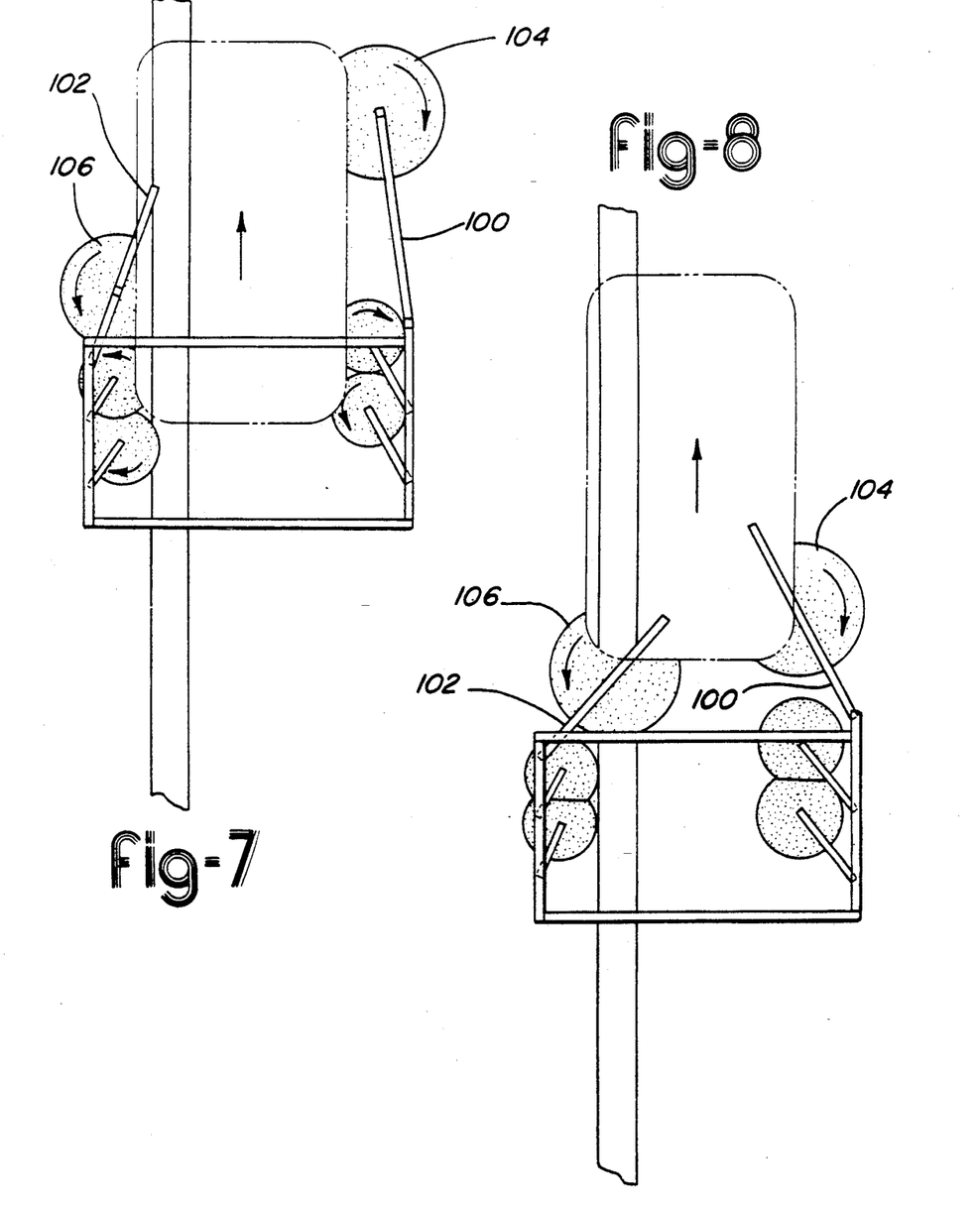

In FIG. 6, the left front corner of the vehicle has engaged the left wraparound wheel causing left boom 102 to pivot outwardly as shown. Once the left boom reaches the outboard position illustrated in FIG. 6, the hydraulic cylinder and cable mechanism holding the carriage in the fully extended position will be released allowing the carriage and wraparound wheel 106 to translate up the boom toward the pivot point. As illustrated in FIG. 7 once the carriage is released relative to the boom, the boom will begin to rotate back toward the inward position as illustrated and the wraparound wheel will continue to follow the contour of the vehicle periphery.

Figures 9, 10:
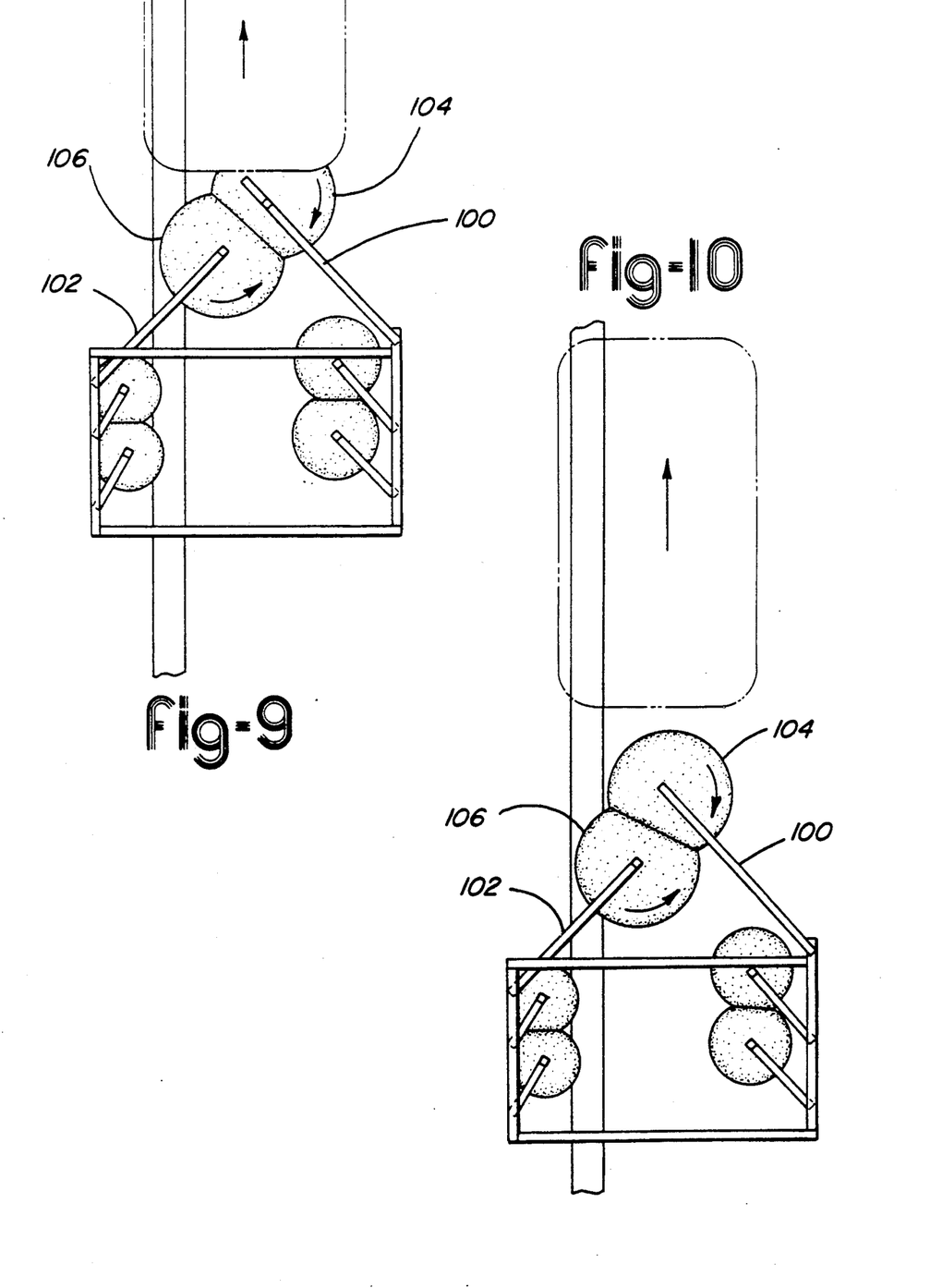

In FIG. 7, the right boom 100 has rotated to the outward position and the right front and the front corner of the vehicle has been washed by the wraparound wheel 104. Once the right wraparound boom 100 reaches the outward position illustrated, the right carriage (not shown) will be released enabling the wraparound wheel to translate up to the boom washing the right side of the car. The right boom 100 will then begin to rotate inwardly returning to the original inwardly extending orientation as shown in FIG. 9.

As the vehicle continues to move away from the wash apparatus from the position shown in FIG. 8, the left carriage 112 and wraparound wheel 106 will translate down the boom toward the free end. The wraparound wheels follow the outer contour of the vehicle washing the rear corners and the rear surface of the vehicle. In FIG. 9, the right wraparound wheel 104 is moving down the boom 100 and is about to reach the end of the boom, wraparound wheels 104 and 106 thoroughly wash the rear surface of the vehicle with sufficient overlap their wash area so that there is no unwashed center section which escapes the wraparound wheels. In FIG. 10, the vehicle is completely out of the wash station and the wraparound washers as well as the side washers have returned their initial position.

Figure 11:
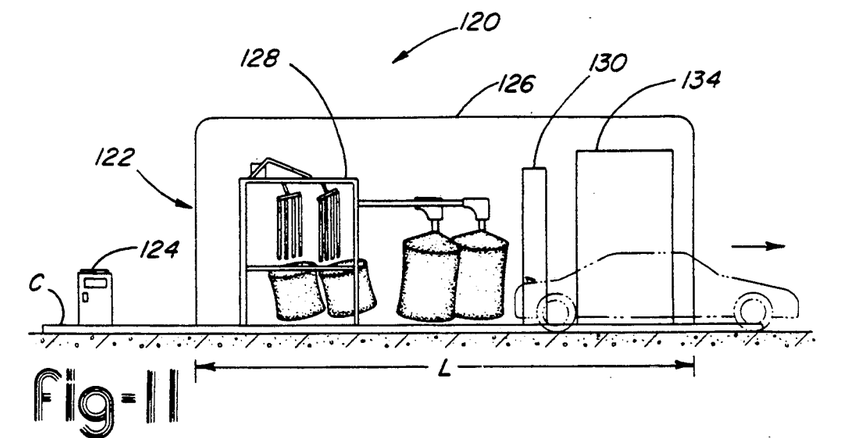
FIG. 11 is a side elevational view of a compact vehicle wash station in which the vehicle wash of the present invention is installed.

FIG. 11 illustrates a side elevational view of a complete car wash station 120 built utilizing a vehicle wash apparatus of the present invention. One of the particular advantages of the present invention is its compact size enables it to be installed in buildings with limited space which were previously exclusive of the domain of the rollover type wash systems. In the drive-through car washing system of FIG. 11, a vehicle illustrated in phantom outline will drive up to the car wash station 120 approaching the entrance end 122 and drive on to a conveyor C. The system can be manually run by an operator or alternatively a kiosk 124 which will take money or a token from the vehicle operator and automatically start the wash cycle.

At the start of the cycle, the conveyor will pick up a wheel of the vehicle and slowly transport the vehicle longitudinally across the car wash floor. A vehicle once having entered the structure 126 will approach a wash apparatus 128. The vehicle will be initially wet by a spray using nozzles of conventional design which can be affixed to the U-shaped arch of the frame of the wash apparatus 128. As previously described, as the vehicle is transported through a washing apparatus 128 the entire exterior surface of the vehicle will be washed. After the washing cycle is complete, a vehicle will drive through a rinse arch 130 where the soapy water will be rinsed from the vehicle, and finally through a drying station 134 where the vehicle will be quickly blown dry. The rinse arches and drying stations are generally well known. A typical drying station is illustrated in U.S. Pat. No. 4,817,301 (Belanger et al). Utilizing a vehicle wash of the present design, the overall length L of the building required to provide a completely automatic drive through car wash can be significantly less than thirty feet depending upon the specific structure of the dryer utilized.

Figure 12:
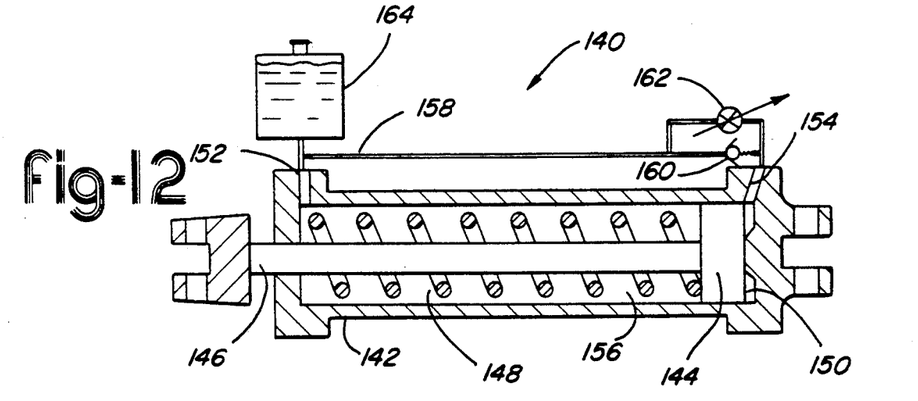
FIG. 12 is a cross-sectional side elevation of a hydraulic actuator.

FIG. 12 shows a cross-sectional side elevational view of an actuator 140 of the type utilized to inwardly bias the side washer frame members so that the side wheels are maintained in contact with the vehicle. Actuator 140 is made up of a hydraulic cylinder having a housing 142 having an internal piston 144 having a piston rod 146 extending therefrom sealingly projecting out of housing 142. The piston 144 divides the internal region of the housing into a first chamber 148 and a second chamber 150 whose relative volumes vary as a function of piston position. Inlet/outlet port 152 communicates with first chamber 148 and inlet/outlet port 154 communicates with second chamber 150. An internal spring 156 is provided to bias the piston to an initial position illustrated.

Actuator 140 is installed between the side wheel arm and the frame in such a manner so that spring 156 urges the associate side wheel inwardly into the path of the vehicle. In the case of the preferred actuator, piston rod 146 is normally retracted as shown. As the vehicle outwardly biases the side wheels, spring 156 is compressed and piston 144 travels relative to housing 142. First and second chambers 148 and 150 are filled with a hydraulic fluid which is displaced from inlet/outlets 152 and 154, respectively, in response to piston movement.

A fluid passageway 158 interconnects the inlet/outlet ports 152 and 154 allowing fluid to communicate therebetween. Fluid passageway 158 has a pair of parallel paths in which check valve 160 and variable restrictor 162 are provided to control the flow of hydraulic fluid between the first and second chambers. Check valve 160 enables the fluid to freely flow from inlet/outlet port 152 to inlet/outlet port 154 while prohibiting flow in the opposite direction. When the piston moves from the extended position back to the retracted position as shown in FIG. 12, returning fluid will be forced to pass through variable restrictor valve 162. Restrictor valve 162 can be adjusted so as to properly dampen the return movement of the wheel wash once the vehicle has traveled sufficiently so it no longer engages the side wheels.

A reservoir 164 is provided and connected to fluid passage 158. Preferably, the volume of the accumulator is in excess of the volume of the piston rod 146 so that second cavity 150 can be completely filled with fluid when the piston is moved to the fully extended position. Reservoir 164 is necessary since the maximum internal volume of the first cavity is less than the second cavity by an amount equal to the cross sectional area of piston rod times the maximum travel. Reservoir 164 when formed of clear plastic also provides a visual indication to the operator of the fluid level and provides a set point convenient means for adding hydraulic fluid to the actuator.

One problem frequently experienced with wraparound washers of the type described with reference to FIGS. 5-10 is front license plate damage resulting from the wraparound wheels catching the unsupported corners of the license plate. As described previously, the wraparound wheels need to rotate in the counterclockwise direction on the left side of the vehicle and then the clockwise direction on the right side of the vehicle so that the reaction force exerted on the wheel causes the wheel and the carriage assembly to translate up the boom toward the frame. When the wraparound wheels clean the rear of the vehicle, no license plate damage problem exists since the cloth brush material forming the wheel strikes the center of the license plate and wipes outward so as to not catch the edges. Note that the right wraparound wheel will not catch the left extremity of the license plate nor will the left wheel catch the right extremity of the license plate.

Figure 13:
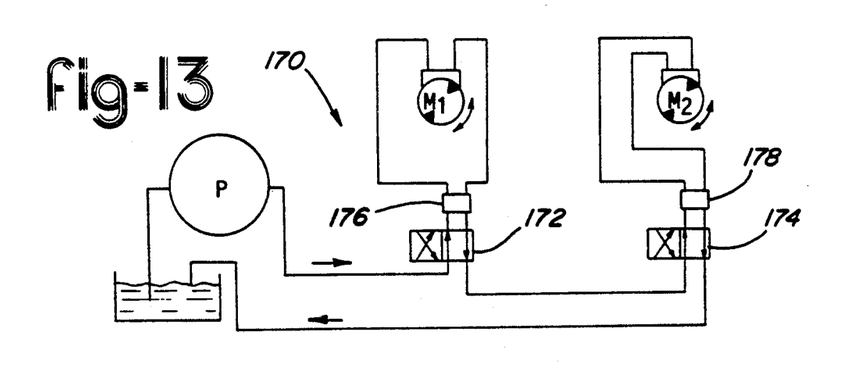
FIG. 13 schematically illustrates an alternative wraparound washer hydraulic control system.

To solve this license plate damage problem, hydraulic circuit 170 in FIG. 13 can be utilized. Hydraulic circuit 170 includes a pair of pneumatically operated control valves 172 and 174 which enable the direction of rotation of hydraulic motors M1 and M2 to be varied. Pressure relief bypass valves 176 and 178 are oriented in the hydraulic circuits between the control valves and the hydraulic motors to prevent a high pressure spike from occurring when the motor direction is reversed. The circuit otherwise functions in a conventional manner. Hydraulic pump P provides a source of high pressure hydraulic fluid which flows in series through hydraulic motors M1 and M2 which in turn is returned to the reservoir as illustrated.

Figure 14:
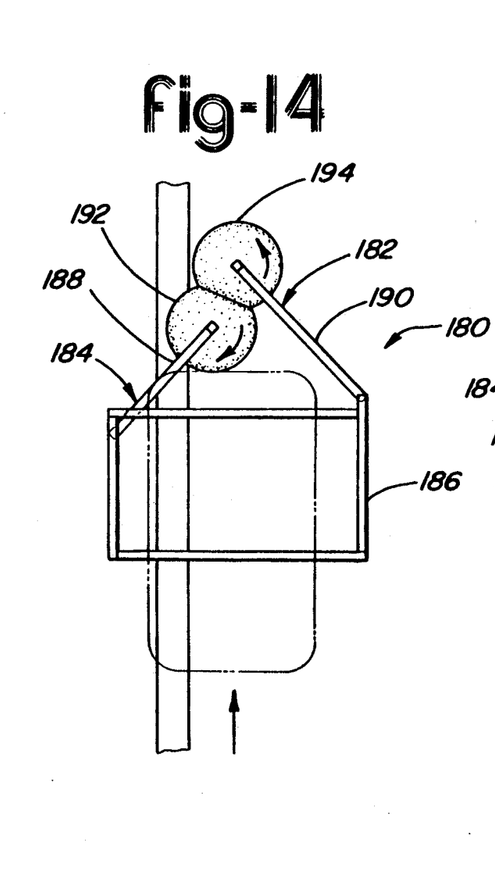
FIGS. 14-16 are a series of schematic plan views showing a vehicle at various positions being cleaned by a pair of wraparound washers utilizing the alternative hydraulic control system of FIG. 13.
Figure 15:
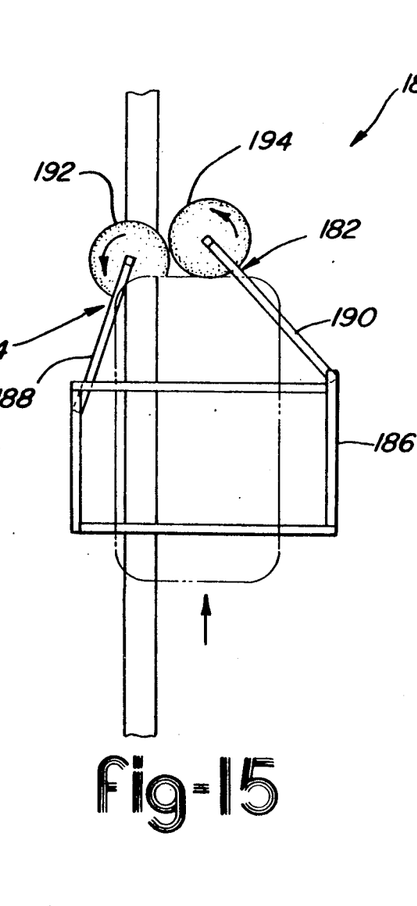
Figure 16:
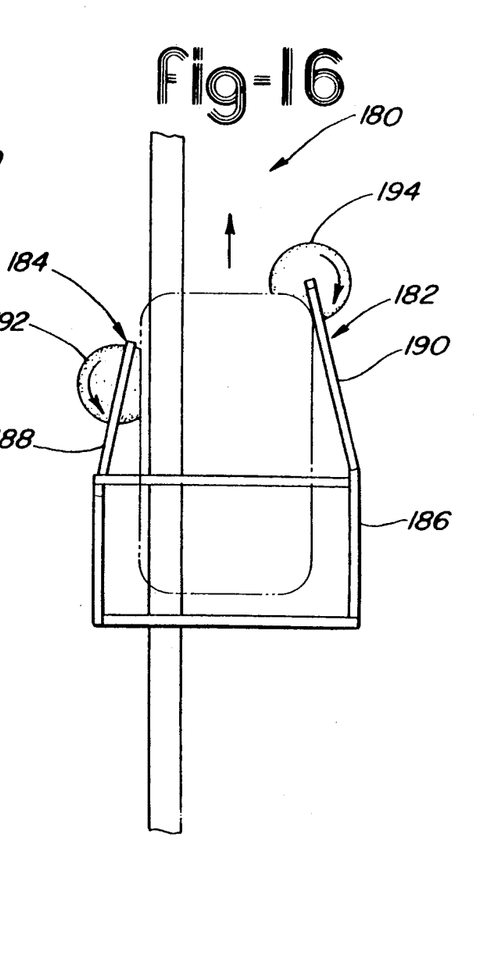

FIGS. 14-16 illustrate an alternative wraparound washer 180 which utilizes a hydraulic control circuit 170 shown in FIG. 13 to enable the direction of rotation of the wraparound wheels to be varied. The wraparound washer 180 is otherwise similar to the wraparound washer described with reference to FIGS. 5-10.

Wraparound washer station 180 is provided with a right wraparound washer 182 and a left wraparound washer 184. The right and left wraparound washers are pivotably attached to frame 186 with the left wraparound washer boom 188 pivotably attached to the frame at a point which is longitudinally forward of the point at which the right wraparound washer 190 is attached. As described previously, the left, forwardmost, wraparound washer boom 188 is slightly shorter than the right, rearwardmost, wraparound washer boom 190. Initially, the left wraparound wheel 192 rotates in the clockwise direction and the right wraparound washer wheel 194 rotates in the counterclockwise direction as illustrated in FIG. 14 so that no damage to the front license plate will occur. After the vehicle moves relative to the left wraparound washer sufficiently to cause wraparound washer wheel 192 to move laterally out of engagement with the license plate and the right wraparound washer wheel 194 as illustrated in FIG. 15, control valve 172 will automatically shift causing the direction of rotation of the left wheel to reverse as illustrated in FIG. 15. The right wraparound wheel 194 continues to rotate in the counterclockwise direction as it is not yet finished washing the front license plate region.

As the vehicle continues forward relative to the wraparound washer as illustrated in FIG. 16, right wraparound wheel 194 has cleared the front license plate area and control valve 174 has been shifted causing the direction of rotation for the right wheel to change to the clockwise direction. From this point in time until to the end of the wraparound washer cycle, the system functions identically to the wraparound washers described with reference to FIGS. 7-10. At the conclusion of the wraparound washer cycle, control valves 172 and 174 are automatically reset so that the wraparound washer wheels will again rotate in the direction illustrated in FIG. 14 so as to avoid license plate damage to the next car to enter the wash station.

Control valves 172 and 174 are each simply regulated by a pair of limit switches. Limit switch 116 (shown in FIG. 2) senses the angular orientation of the boom to cause the direction of rotation to reverse and another limit switch 118 senses the return of the carriage to the fully extended position on the end of the boom to reset the control valves 172 and 174 to the start position.

While the best modes for carrying out the invention have been described in detail, those familiar with the art to which the invention relates will recognize various alternative designs and embodiments for practicing the invention as defined by the following claims.

What is claimed is:

1. A drive-through vehicle wash of the type in which a vehicle is translated forwardly relative thereto along a longitudinal axis, the vehicle wash comprising:

a frame having right and left frame members adapted to be affixed to a floor surface, and a frame overhead member extending therebetween to form a U-shaped arch of sufficient size to allow a vehicle to pass therethrough;

right and left side washers including right and left rotary side wheels laterally aligned with one another for washing right and left sides of the vehicle, attachment means for attaching the right and left side wheels to the right and left frame members respectively, enabling shiftable movement of the side wheels between a normally inward position closest to the longitudinal axis and an outward position spaced away from the longitudinal axis a distance sufficient to allow the vehicle to pass therebetween, and drive means for rotating the side wheels about right and left side wheel axes;

a curtain washer, including a subframe shiftably attached to the frame overhead member, in lateral alignment with the right and left side washers, an overhead curtain suspended from the subframe and hanging downwardly therefrom into the path of the vehicle, and a curtain drive for shifting the subframe relative to the frame to increase the relative movement of a portion of the curtain engaging upper surfaces of the vehicle passing thereunder; and right and left wraparound washers respectively having elongated right and left booms which are each horizontally pivotably attached to the frame on opposite sides of the longitudinal axis above the path of the vehicle, said booms each extending rearwardly from the frame and inwardly toward the longitudinal axis to form an acute angle therewith, and right and left rotatable wraparound wheels respectively supported upon the right and left booms wherein front sides and rear portions of the vehicle are cleaned by the right and left wraparound wheels as they follow the peripheral contour of the vehicle as it moves along the longitudinal axis.

2. The vehicle wash of claim 1 wherein said right and left side washers each further comprises, deflector means for preventing the curtain from becoming entangled in the side washers.

3. The vehicle wash of claim 1 wherein said right and left side wheels are each rotatable about a right and left side wheel axes which are inclined outwardly relative to one another causing the side wheel axes to be closest to one another adjacent the floor.

4. The vehicle wash of claim further comprising bias means to urge the side wheels to the inward position.

5. The vehicle wash of claim 4 wherein said bias means further comprises a spring cooperating with the attachment means to urge the right and left side wheels to the inward position and a hydraulic damper for limiting the speed in which the side wheels return to the inward position after the vehicle passes thereby.

6. The vehicle wash of claim 4 wherein said bias means further comprises a hydraulic cylinder having one end affixed to the frame and the other end affixed to the attachment means and having an internal spring position therein to urge the side wheels to the inward position, said hydraulic cylinder having a pair of inlet/outlet ports interconnected by a fluid passageway through which fluid is displaced as the hydraulic cylinder varies in length, said fluid passageway including a check valve to allow fluid to freely pass in the direction resulting in the outward movement of the side wheels and a restriction to hinder the flow of fluid in the opposite direction.

7. The vehicle wash of claim 6 wherein said hydraulic cylinder further comprises an reservoir in communication with the fluid passageway.

8. The vehicle wash of claim 1 wherein each of said right and left side washers further comprise a pair of counter rotating side wheels.

9. The vehicle wash of claim 1 wherein the right and left wraparound washers further comprises a right and left carriage slidably mounted on the right and left boom for respectively supporting the right and left wraparound wheels.

10. The vehicle wash of claim 9 wherein the right and left wraparound wheels have a maximum radius R and wherein one of the wraparound washer booms is pivotably attached to the frame at a point which is longitudinally forward a distance X of the point in which the other of the wraparound washer booms is pivotably affixed to the frame where, X is not more than R.

11. The vehicle wash of claim 10 wherein the wraparound washer boom having the forwardly oriented pivot point has an effective length which is shorter than the rearwardly oriented washer boom by an amount which is equal to at least R/4.

12. The vehicle wash of claim 1 wherein the right and left wraparound wheels have a maximum radius R and wherein one of the wraparound washer booms is pivotably attached to the frame at a point which is longitudinally forward a distance X of the point in which the other of the wraparound washer booms is pivotably affixed to the frame where X is not more than R.

13. The vehicle wash of claim 12 wherein the right and left booms are oriented approximately 90° to one another when in their inward most position.

14. A drive through vehicle wash of the type in which a vehicle is translated forwardly relative thereto along a longitudinal axis by a conveyor, the vehicle wash comprising:

a frame having right and left frame members adapted to be affixed to a floor surface and frame overhead member extending therebetween to form a U-shaped arch of sufficient size to allow a vehicle to pass therethrough;

right and left side washers including right and left rotary side wheels laterally aligned with one another for washing right and left sides of the vehicle, attachment means for attaching the right and left side wheels to the right and left frame members respectively, enabling shiftable movement thereof between a normally inward position closest to the longitudinal axis and an outward position spaced away from the longitudinal axis a distance sufficient to allow the vehicle to pass therebetween, and drive means for rotating the side wheels about right and left side wheel axes;

a curtain washer, including a subframe shiftably attached to the frame overhead member, in lateral alignment with the right and left side washers, an overhead curtain suspended from the subframe and hanging downwardly therefrom into the path of the vehicle, and an oscillating drive for shifting the subframe relative to the frame to increase the relative movement of a portion of the curtain engaging upper surfaces of the vehicle passing thereunder; and wherein said right and left side washers each further comprises deflector means for preventing the curtain from becoming entangled in the side washers.

15. The vehicle wash of claim 14 further comprising bias means to urge the side wheels to the inward position.

16. The vehicle wash of claim 15 wherein said bias means further comprises a spring cooperating with the attachment means to urge the right and left side wheels to the inward position and a hydraulic damper for limiting the speed in which the side wheels return to the inward position after the vehicle passes thereby.

17. The vehicle wash of claim 15 wherein said bias means further comprises a hydraulic cylinder having one end affixed to the frame and the other end affixed to the attachment means and having an internal spring position therein to urge the side wheels to the inward position, said hydraulic cylinder having a pair of inlet/outlet ports interconnected by a fluid passageway through which fluid is displaced as the hydraulic cylinder varies in length, said fluid passageway including a check valve to allow fluid to freely pass in the direction resulting in the outward movement of the side wheels and a restriction to hinder the flow of fluid in the opposite direction.

18. The vehicle wash of claim 17 wherein said hydraulic cylinder further comprises an reservoir in communication with the fluid passageway.

19. A drive through vehicle wash of the type in which a vehicle is translated forwardly relative thereto along a longitudinal axis by a conveyor, the vehicle wash comprising:

a frame having right and left frame members adapted to be affixed to a floor surface and frame overhead member extending therebetween to form a U-shaped arch of sufficient size to allow a vehicle to pass therethrough, the vehicle having right and left side portions extending between a rocker panel adjacent the floor and a generally horizontal glass line;

right and left side washers including generally vertical right and left pairs of counter rotating side wheels laterally aligned with one another and having sufficient length to wash said right and left side portions of the vehicle, attachment means for attaching the right and left side wheel pairs to the right and left frame members respectively, enabling shiftable movement thereof between a normally inward position closest to the longitudinal axis and an outward position spaced away from the longitudinal axis a distance sufficient to allow the vehicle to pass therebetween, and drive means for rotating the side wheel pairs about right and left side wheel axes;

a curtain washer, including a subframe shiftably attached to the frame overhead member, in lateral alignment with the right and left side washers, an overhead curtain suspended from the subframe and hanging downwardly therefrom extending below the vehicle glass line into the path of the vehicle and having sufficient lateral width to engage the right and left side wheel pairs when in the normally inward position, and an oscillating drive for shifting the subframe relative to the frame to increase the relative movement of a portion of the curtain engaging upper surfaces of the vehicle passing thereunder; and bias means cooperating with said attachment means for urging the right and left side wheel pairs to the inward position.

20. The vehicle wash of claim 19 wherein said bias means further comprises a spring cooperating with the attachment means to urge the right and left side wheels to the inward position and a hydraulic damper for limiting the speed in which the side wheels return to the inward position after the vehicle passes thereby.

21. The vehicle wash of claim 20 wherein said hydraulic damper further comprises a hydraulic cylinder wherein said spring is oriented within the hydraulic cylinder, said cylinder having a pair of inlet/outlet ports interconnected by a fluid passageway through which fluid is displaced as the hydraulic cylinder varies in length, said fluid passageway including a check valve to allow the fluid to freely pass in the direction resulting in the outboard movement of the side wheels and a restriction to hinder the flow of fluid in the opposite direction.

22. The vehicle wash of claim 21 wherein said hydraulic cylinder further comprises an reservoir in communication with the fluid passageway.

* * * * *